Patented Dec. 26, 1939

2,184,539

UNITED STATES PATENT OFFICE 2,184,539

PIGMENT CHIP COMPOSITION

David R. Wiggam, Kennett Square, Pa., assignor to Hercules Powder Company, Wilmington, Del., a corporation of Delaware No Drawing. Application August 15, 1936, Serial No. 96,319

7 Claims. (Cl. 134—79)

My invention relates to an improved method for grinding pigments and to the product thereof. More particularly, it relates to a method for grinding pigments in ethyl cellulose and to the product thereof.

In the production of pigmented lacquers, enamels, and paints it is necessary to grind the pigment into the vehicle to secure complete wetting of the pigment and to break up the aggregates of the pigment particles. Such grinding is ordinarily done by suspending the pigment in a fluid vehicle which forms a part or all of the finished coating composition and then grinding this suspension in a ball mill or a burr mill. This is a time consuming and expensive operation.

Heretofore it has been proposed to reduce the time and expense of this operation by grinding pigment with plasticized nitrocellulose containing a small amount of a volatile solvent to produce a concentrated dispersion of pigment in the solid plasticized nitrocellulose. Such dispersions are produced commercially and are known as "nitrocellulose pigment chips". Nitrocellulose pigment chips can be advantageously used in the production of pigmented nitrocellulose lacquers without further grinding by dissolving the pigment chip in a clear lacquer composition.

The production of nitrocellulose pigment chips is a hazardous operation due to the inflammable nature of nitrocellulose and the severe mechanical treatment necessary to produce a good dispersion of pigment. The use of a volatile solvent for the nitrocellulose adds to the fire and explosion hazard of the operation, since the solvents used are highly inflammable in nature. The number of pigments which can be used in the production of pigment chips is limited, since pigments which are oxidizing in character cause fires and explosions in the grinding operation. The use of nitrocellulose pigment chips is further restricted by the incompatability of nitrocellulose with many film-forming materials, so that their use is practically restricted to pigmented nitrocellulose lacquers.

An object of my invention is to provide a pigment chip which can be used in a wide variety of different types of finishes and which may contain any of the usual protective coating pigments.

A further object of my invention is to provide a method for the production of pigment chips which practically eliminates risks from fire and explosion during the grinding operation, which eliminates any necessity for the use of an inflammable volatile solvent in the grinding operation, which allows the use of any known commercial pigment, and which will produce complete dispersions of even the more difficult dispersible pigments in a comparatively short grinding period.

The product in accordance with my invention comprises solid colloided ethyl cellulose containing a high percentage of finely dispersed pigment. The colloided ethyl cellulose may, if desired, contain either a solvent or a non-solvent plasticizer. The ethyl cellulose contained therein may be any of the usual commercial viscosity types. Thus, a high, medium, or low viscosity type may be used as desired. The ethoxy content of the ethyl cellulose may be within the range of about 42% to about 54% by weight, and will preferably be within the range of about 46% to about 49.5% by weight.

The product in accordance with my invention may contain any of the numerous pigments suitable for use in protective coatings, such as, for example, zinc oxide, zinc sulfide, lithopone, titanium dioxide, antimony trioxide, carbon black, iron blue, chrome yellow, chrome green, cadmium red, toluidine toner, para toner, etc.

The product in accordance with this invention will contain a pigment or a mixture of pigments in amount substantially in excess of that used in a protective coating or molding composition, and is intended for use as an intermediate in the production of protective coating and molding compositions. In fact, my new product will be found unsuited for use per se as a protective coating or molding composition due to its high pigment content.

The maximum amount of pigment which the product in accordance with this invention may contain is the amount that can be completely and uniformly dispersed in the colloided ethyl cellulose and depends upon the oil absorption value of the particular pigment used.

Ordinarily, it will be found desirable to use from about 10% to about 20% pigment by weight of the finished pigment chip, less than the maximum amount which can be dispersed. When the maximum amount of pigment is used it will be found, particularly in the case of pigments having a high oil absorption value, that the finished pigment chip will be dissolved slowly and incompletely in solvents. The practical upper limit of the amount of pigment which may desirably be used will be found to coincide closely with the appearance of a shortness of bead while grinding. Usually it will be found desirable to use an amount of pigment near the practical upper limit. The maximum amounts and the practical maximum amounts of pigments which can be used in my new pigment chips are illustrated by the data given in Table I for four representative pigments of different colors in percentage by weight of the finished pigment chip.

TABLE I

|  | Maximum | Practical maximum |
| --- | --- | --- |
|  | Percent | Percent |
| Carbon black (Super spectrabrand) | 55 | 40-45 |
| Iron blue | 60-65 | 55-60 |
| Chrome yellow | 85 | 75-80 |
| Zinc oxide | 85 | 75-80 |

Ordinarily it will be desirable that the product in accordance with this invention contain an amount of pigment near the upper practical limit. However, for certain uses, and with certain pigments it is desirable to use somewhat less than this amount. In any case, the amount of pigment contained in my product will not be less than about 0.4 of the maximum percentage that can be uniformly dispersed, and usually not less than 0.5 of the practical maximum percentage.

It will be appreciated that it is impossible to set a definite limitation of the range of percentages by weight of pigment, which the product in accordance with my invention may contain, which will cover the useful range for all pigments, because of the wide variation in the oil-absorption values and the specific gravities of different pigments, and consequently the useful ranges vary widely with different pigments. The product in accordance with this invention will in all cases contain substantially greater proportions of any given pigment than can be used in an enamel or molding plastic.

A variety of solvent and non-solvent plasticizers may be used in the product in accordance with my invention. Solvent plasticizers which may be used are, for example, tricresyl phosphate, tributyl phosphate, dibutyl phthalate, butylphthalyl butylglycollate, methylphthalyl ethylglycollate, chlorinated diphenyl, hydrogenated alkyl abietates, triethyl citrate, etc. Non-solvent plasticizers which are suitable are castor oil, butyl stearate, neutralized hydrogenated rosin oil, etc. I prefer to use the least volatile of the solvent plasticizers. Tricresyl phosphate is particularly useful.

The method in accordance with my invention comprises colloiding ethyl cellulose, at an elevated temperature by the milling, and uniformly dispersing the desired amount of pigment throughout the colloided ethyl cellulose. I prefer to first mill the ethyl cellulose until it is completely colloided, and then mill the pigment into the plastic mass of colloided ethyl cellulose. Any mill suitable for working stiff plastic masses is suitable for this purpose, as, for example, a differential two-roll mill, a mixer of the nature of a Banbury mixer as described in U. S. Patent 1,523,387, etc.

A solvent or non-solvent plasticizer may be added to the ethyl cellulose in the colloiding operation as desired. Unplasticized ethyl cellulose produces tougher plastic and requires a higher working temperature than when plasticized with a solvent plasticizer and it will be found that a pigment can be completely dispersed in a shorter time in the ethyl cellulose when a solvent plasticizer is not present. Non-solvent plasticizers will be found to have very little or no effect on the working temperature of the plastic. The presence of either a solvent or a non-solvent plasticizer has an undesirable effect upon the solubility of the finished pigment chips when containing certain pigments. Thus, for example, I have found that the presence of a solvent plasticizer decreases the solubility of carbon black and iron blue pigment chips, but had practically no effect on the solubility of zinc oxide and chrome yellow pigment chips.

When using pigments which are discolored at the normal colloiding temperature for ethyl cellulose, the colloiding temperature may be lowered and pigment discoloration avoided by the addition of a solvent plasticizer to the plastic.

The temperature at which the ethyl cellulose is colloided and the pigment dispersed therein in the method in accordance with this invention will depend upon the amount of solvent plasticizer used. In the absence of a solvent plasticizer, an operating temperature within the range of about 125° C. to about 150° C. may be used. I have found that a temperature of 135° C. is ordinarily satisfactory. The required operating temperature will be found to decrease as the amount of solvent plasticizer contained is increased. The optimum temperature for a particular composition may be readily established by progressively raising the temperature of the mill as the ingredients are being worked and observing their behavior.

The time of milling required to produce pigment chip in which the pigment is completely and uniformly dispersed will depend upon a number of factors, such as pigment used, size of batch, efficiency of the mill, and various other operating conditions. When operating under optimum conditions it will be found that the particular pigment used has a marked influence upon the time required. I have found that pigments which are difficult to grind may be completely and uniformly dispersed under optimum working conditions in less than thirty minutes, while a pigment which is easily ground may be completely and uniformly dispersed in less than five minutes.

In following the method in accordance with my invention, dry pigment may be dispersed in the colloided ethyl cellulose, and I prefer to use the pigment in the dry condition when using a mill of the Banbury type. When using a mill of the differential two-roll type, I prefer to use the pigment wet with a volatile non-inflammable liquid which is a non-solvent for ethyl cellulose. Water will be found entirely satisfactory for wetting the pigment, and is preferred. The amount of the volatile liquid used may be varied over a wide range. Usually, I prefer to use equal weights of the volatile liquid and the pigment.

The products and process in accordance with this invention are further illustrated by the following tables:

TABLE II
CARBON BLACK PIGMENT GRINDS
*Two-roll mill*

| Formula No | 1 | 2 | 3 | 4 | 5 |
|---|---|---|---|---|---|
| Ethyl cellulose Lot 218 (low viscosity) | 56 | 48 | 35 | 28 | 18 |
| Tricresylphosphate | 14 | 12 | 15 | 21.1 | 19.7 |
| Carbon black | 30 | 40 | 50 | 60 | 70 |
| Pigment in chip _____ percent | 30 | 40 | 50 | 55 | 60 |
| Temperature of back roll _____ °C | 115 | 125 | 135 | 135 | 135 |
| Temperature of front roll _____ °C | 95 | 100 | 125 | 135 | 135 |
| Total time of grinding ____ minutes | 26 | 26 | 26 | 10 | 10 |
|  | Good bead, no plasticizer loss. | Good bead, slight plasticizer loss. | Good bead, dull, considerable plasticizer loss, causing increased shortness of bead. | Short bead, losing plasticizer so rapidly that grinding was discontinued after 10 minutes. | Fell from rolls in 10 minutes. |

Comment: Complete dispersion of pigment within 26 minutes.

TABLE III
CARBON BLACK PIGMENT GRINDS
*Two-roll mill*

| Formula No | 1 | 2 | 3 | 4 | 5 | Formula No | 6 | 7 | 8 | 9 | 10 |
|---|---|---|---|---|---|---|---|---|---|---|---|
| Ethyl cellulose Lot 222 (low viscosity) | 70 | 56 | 49 | 42 |  | Ethyl cellulose Lot 222 (low viscosity) |  |  | 42 | 42 | 42 |
| Ethyl cellulose Lot 227 (low viscosity) |  |  |  |  | 42 | Ethyl cellulose Lot 225 (low viscosity) | 42 |  |  |  |  |
| Tricresylphosphate |  | 14 | 21 | 28 | 28 | Ethyl cellulose I. G. (low viscosity) |  | 42 |  |  |  |
| Super Spectra carbon black | 30 | 30 | 30 | 30 | 30 | Tricresylphosphate | 28 | 28 |  | 28 | 28 |
| Pigment in chip _____ percent | 30 | 30 | 30 | 30 | 30 | Baker's #15 heavy bodied castor oil |  |  | 28 |  |  |
| Temperature of back roll _____ °C | 135 | 110 | 100 | 100 | 100 | Abietic acid (commercial) |  |  |  | 3 |  |
| Temperature of front roll _____ °C | 125 | 100 | 95 | 95 | 95 | Super Spectra carbon black | 30 | 30 | 30 | 30 | 30 |
| Total time of grinding _____ minutes | 25 | 25 | 25 | 25 | 25 | Pigment in chip _____ percent | 30 | 30 | 30 | 30 | 30 |
|  |  |  |  |  |  | Temperature of back roll _____ °C | 100 | 100 | 130 | 100 | 100 |
|  |  |  |  |  |  | Temperature of front roll _____ °C | 95 | 95 | 115 | 95 | 95 |
|  |  |  |  |  |  | Total time of grinding _____ minutes | 25 | 25 | 25 | 25 | 50 |

Comment: Pigment added water wet. Good bead in every case. No plasticizer loss.

Comment: Additional grinding time used for #10 not necessary. Abietic acid used in #9 as a wetting agent. The castor oil used in #8 was absorbed by pigment and grinding was then similar to #1, which contains no plasticizer.

TABLE IV
ZINC OXIDE PIGMENT GRINDS
*Two-roll mill*

| Formula No | 1 | 2 | 3 | 4 | 5 |
|---|---|---|---|---|---|
| Ethyl cellulose Lot 222 (low viscosity) | 64 | 45 | 35 | 26 | 18 |
| Dibutylphthalate | 16 | 15 | 15 | 14 | 12 |
| Zinc oxide | 120 | 140 | 150 | 160 | 170 |
| Pigment in chip _____ percent | 60 | 70 | 75 | 80 | 85 |
| Temperature of back roll _____ °C | 110 | 110 | 115 | 115 | 125 |
| Temperature of front roll _____ °C | 100 | 100 | 100 | 100 | 105 |
| Total time of grinding _____ minutes | 26 | 26 | 26 | 26 | 15 |
|  | Good bead. | Good bead. | Slight shortness of bead. | Very short bead. | Extremely short bead. |

Comment: Plasticizer was lost from all mixtures during grinding, indicating dibutylphthalate to be less desirable than tricresylphosphate. Complete dispersion is less than 5 minutes in every case. Pigment added water wet. Pigment ground with exceptional ease.

TABLE V
IRON BLUE PIGMENT GRINDS
*Two-roll mill*

| Formula No | 1 | 2 | 3 | 4 | 5 |
|---|---|---|---|---|---|
| Ethyl cellulose Lot 218 (low viscosity) | 48 | 32.5 |  |  |  |
| Ethyl cellulose Lot 222 (low viscosity) |  |  | 24 | 21 |  |
| Ethyl cellulose I. G. (low viscosity) |  |  |  |  | 48 |
| Tricresylphosphate | 12 | 17.5 | 16 | 21 | 12 |
| Chinese blue A-1835 | 40 | 50 | 60 | 78 |  |
| Non-bronzing blue X-882 |  |  |  |  | 40 |
| Pigment in chip _____ percent | 40 | 50 | 60 | 65 | 40 |
| Temperature of back roll _____ °C | 115 | 115 | 120 | 125 | 115 |
| Temperature of front roll _____ °C | 100 | 100 | 105 | 105 | 100 |
| Total time of grinding _____ minutes | 26 | 26 | 26 | 5 | 30 |
|  | Good bead. | Good bead. | Slight shortness of bead. | Fell from rolls in five minutes. | Slight shortness of bead. |

Comment: No plasticizer was lost from these mixtures. Complete dispersion of pigment within 26 minutes. Pigment added water wet.

TABLE VI
Chrome Yellow Pigment Grinds
*Two-roll mill*

| Formula No. | 1 | 2 | 3 | 4 | 5 | 6 |
|---|---|---|---|---|---|---|
| Ethyl cellulose Lot 222 (low viscosity) | 80 | 64 | 45 | 35 | 26 | 18 |
| Tricresylphosphate | 20 | 16 | 15 | 15 | 14 | 12 |
| Chrome yellow | 100 | 120 | 140 | 150 | 160 | 170 |
| Pigment in chip percent | 50 | 60 | 70 | 75 | 80 | 85 |
| Temperature of back roll °C | 115 | 115 | 115 | 115 | 115 | 125 |
| Temperature of front roll °C | 100 | 100 | 100 | 100 | 100 | 100 |
| Total time of grinding minutes | 26 | 26 | 26 | 26 | 26 | 26 |
|  | Good bead. | Good bead. | Good bead. | Slight shortness of bead. | Bead somewhat short. | Bead somewhat short. |

Comment: No plasticizer was lost from these grinds. Pigment added water wet. Complete dispersion of pigment within 5 minutes. Pigment ground with exceptional ease.

TABLE VII
Miscellaneous Pigment Grinds
*Two-roll mill*

| Formula No. | 1 | 2 | 3 | 4 | 5 | 6 | 7 |
|---|---|---|---|---|---|---|---|
| Ethyl cellulose I. G. (low viscosity) |  | 60 | 40 | 60 | 60 | 20 | 75 |
| Ethyl cellulose I. G. (medium viscosity) | 41.67 |  |  |  |  |  |  |
| Super Spectra carbon black | 33.33 | 40 |  |  |  |  | 25 |
| Chinese blue A-1835 |  |  | 60 |  |  |  |  |
| Titanium dioxide |  |  |  |  |  | 75 |  |
| Zinc oxide |  |  |  |  | 225 |  |  |
| Chrome yellow A-548 |  |  |  | 225 |  |  |  |
| Tricresylphosphate | 25.00 |  |  | 15 | 15 | 5 |  |
| Pigment in chip percent | 33.3 | 40 | 60 | 75 | 75 | 75 | 25 |
| Temperature of back roll °C | 125 | 135 | 135 | 135 | 135 | 135 | 135 |
| Temperature of front roll °C | 125 | 110 | 110 | 110 | 110 | 110 | 110 |
| Total time of grinding minutes | 10 | 25 | 25 | 5 | 5 | 5 | 20 |
|  | Good bead. | Short bead. | Short bead. | Slight shortness of bead. | Short bead. | Short bead. | Slight shortness of bead. |

TABLE VII—Continued
Miscellaneous Pigment Grinds
*Two-roll mill*

| Formula No. | 8 | 9 | 10 | 11 | 12 | 13 |
|---|---|---|---|---|---|---|
| Ethyl cellulose I. G. (low viscosity) | 24 | 20 | 24 | 74 |  | 74 |
| Ethyl cellulose I. G. (high viscosity) |  |  |  |  | 22 |  |
| Super Spectra carbon black |  |  |  | 66 |  |  |
| Non-bronzing blue X-882 |  |  |  | 15 |  |  |
| Chrome yellow A-548 |  |  | 75 |  |  | 70 |
| Chrome green |  | 70 |  |  |  |  |
| Cadmium red |  |  |  | 70 |  |  |
| C. P. toluidine toner |  |  |  |  | 70 |  |
| Tricresylphosphate | 6 | 5 | 6 | 19 |  | 6 |
| Butylphthalate butylglycollate |  |  |  |  | 8 |  |
| Pigment in chip percent | 70 | 75 | 70 | 46.6 | 70 | 70 |
| Temperature of back roll °C | 125 | 135 | 135 | 135 | 125 | 125 |
| Temperature of front roll °C | 100 | 110 | 110 | 110 | 105 | 105 |
| Total time of grinding minutes | 15 | 5 | 15 | 15 | 15 | 6 |
|  | Slight shortness of bead. | Slight shortness of bead. | Slight shortness of bead. | Short bead. | Short bead. | Good bead. |

TABLE VIII
Pigment Grinds
*Banbury mixer (midget size)*

| Formula No. | 1 | 2 | 3 | 4 |
|---|---|---|---|---|
| Ethyl cellulose I. G. (low viscosity) pounds | 0.48 | 0.36 | 0.36 | 0.36 |
| Tricresylphosphate do | 0.07 | 0.03 | 0.03 | 0.03 |
| Zinc oxide do | 1.4 |  |  |  |
| Chrome yellow do |  | 1.17 |  |  |
| Chinese blue do |  |  | 0.48 |  |
| Carbon black do |  |  |  | 0.26 |
| Pigment in grind percent | 70 | 75 | 55 | 40 |
| Temperature of mill °C | 100 | 100 | 100 | 100 |
| Time of grinding minutes | 5 | 5 | 10 | 10 |

Comment: All grinds were sheeted on a differential two-roll mill. In every case the mill could have handled a higher percentage of pigment.

The product in accordance with this invention is useful in the production of pigmented nitrocellulose lacquers, varnishes, enamels, paints, printing inks, wax crayons, etc. Chips prepared from easily wetted pigments such as chrome yellow and zinc oxide which are easily dispersed in the ethyl cellulose plastic, dissolve readily in nitrocellulose lacquer compositions, requiring very little agitation, and even more readily in lacquer solvents. Iron blue chips containing up to 50% by weight of pigment and carbon black chips containing up to 30% by weight likewise dissolve completely in both lacquer compositions and lacquer solvents, although more time is required for complete solution.

The pigment chips in accordance with this invention can be used in all lacquer formulas which contain 15 parts of resin or less to 10 parts of nitrocellulose, including those formulated with resins which are incompatible with ethyl cellulose alone. The pigment chips, in accordance with this invention can be used to pigment lacquers having a high resin content, as, for example, 20 parts or more of resin to 10 parts of nitrocellulose when formulated with resins compatible with ethyl cellulose.

The pigment chips, in accordance with this invention, will be found to give exceedingly smooth pigmented compositions, when used in their formulation, even when containing difficulty dispersable pigments. This is due to the exceedingly complete and uniform dispersion of the pigment which can readily be obtained in an ethyl cellulose plastic.

It will be understood that the details and examples hereinbefore set forth are illustrative only, and that the invention as herein broadly described and claimed is in no way limited thereby.

What I claim and desire to protect by Letters Patent is:

1. A method of producing a pigment chip which consists of milling a mixture that is substantially non-volatile at normal room temperatures and that requires a milling temperature of above about 100° C. to effect colloiding, said mixture comprising ethyl cellulose and a pigment within the range of about 40% to about 90% by weight of the maximum amount which can be dispersed in the ethyl cellulose as determined by a shortness of bead while milling at the temperature at which the ethyl cellulose is colloided from about 100° C. to about 150° C. until the pigment is uniformly dispersed throughout the resulting ethyl cellulose colloid.

2. A method of producing a pigment chip which consists of milling a mixture that is substantially non-volatile at normal room temperatures and that requires a milling temperature of above about 100° C. to effect colloiding, said mixture comprising ethyl cellulose and a pigment within the range of about 40% to about 90% by weight of the maximum amount which can be dispersed in the ethyl cellulose as determined by a shortness of bead while milling and a plasticizer in amount and so proportioned as to require a milling temperature of above about 100° C.

3. A method of producing a pigment chip which consists of milling a mixture that is substantially non-volatile at normal room temperatures and that requires a milling temperature of above about 100° C. to effect colloiding, said mixture comprising ethyl cellulose and a pigment within the range of about 40% to about 90% by weight of the maximum amount which can be dispersed in the ethyl cellulose as determined by a shortness of bead while milling and a non-solvent plasticizer in amount and so proportioned as to require a milling temperature of above about 100° C.

4. A method of producing a pigment chip which consists of milling a mixture that is substantially non-volatile at normal room temperatures and that requires a milling temperature of above about 100° C. to effect colloiding, said mixture comprising ethyl cellulose and a pigment within the range of about 40% to about 90% by weight of the maximum amount which can be dispersed in the ethyl cellulose as determined by a shortness of bead while milling and a solvent plasticizer in amount and so proportioned as to require a milling temperature of above about 100° C.

5. A method of producing a pigment chip which consists of milling a mixture that is substantially non-volatile at normal room temperatures and that requires a milling temperature of above about 100° C. to effect colloiding, said mixture comprising ethyl cellulose and a pigment within the range of about 40% to about 90% by weight of the maximum amount which can be dispersed in the ethyl cellulose as determined by a shortness of bead while milling and tricresyl phosphate in amount and so proportioned as to require a milling temperature of above about 100° C.

6. A method of producing a pigment chip which consists of milling a mixture that is substantially non-volatile at normal room temperatures and that requires a milling temperature of above about 100° C. to effect colloiding, said mixture comprising ethyl cellulose and a pigment within the range of about 40% to about 90% by weight of the maximum amount which can be dispersed in the ethyl cellulose as determined by a shortness of bead while milling and dibutyl phthalate in amount and so proportioned as to require a milling temperature of above about 100° C.

7. A method of producing a pigment chip which consists of milling a mixture that is substantially non-volatile at normal room temperatures and that requires a milling temperature of above about 100° C. to effect colloiding, said mixture comprising ethyl cellulose and a pigment within the range of about 40% to about 90% by weight of the maximum amount which can be dispersed in the ethyl cellulose as determined by a shortness of bead while milling and castor oil in amount and so proportioned as to require a milling temperature of above about 100° C.

DAVID R. WIGGAM.